United States Patent [19]

Johnson et al.

[11] 4,416,506

[45] Nov. 22, 1983

[54] APPARATUS FOR SPLICING FIBER OPTIC WAVEGUIDES

[75] Inventors: Tore R. Johnson, Harrisburg; Keith Johnson, Jr., Manheim, both of Pa.

[73] Assignee: AMP Incorporated, Harrisburg, Pa.

[21] Appl. No.: 285,714

[22] Filed: Jul. 22, 1981

[51] Int. Cl.³ .............................................. G02B 7/26
[52] U.S. Cl. .................................. 350/96.21; 29/237; 29/267; 29/283.5
[58] Field of Search ................. 350/96.20, 96.21, 321; 285/382, 382.1, 382.2; 29/751, 761, 234, 237, 29/242, 243, 267, 283.5

[56]  References Cited

U.S. PATENT DOCUMENTS

| 3,325,885 | 6/1967 | Ziegler, Jr. et al. | 29/203 |
| 3,553,835 | 1/1971 | Demler, Sr. et al. | 29/628 |
| 3,845,538 | 11/1974 | Demler, Sr. | 29/234 |
| 3,877,735 | 4/1975 | Demler, Sr. | 285/382.1 |
| 4,019,241 | 4/1977 | Logan | 350/96.21 X |
| 4,047,796 | 9/1977 | Kao et al. | 350/96.21 |
| 4,248,499 | 2/1981 | Liertz et al. | 350/96.21 |
| 4,257,135 | 3/1981 | Moebius | 29/237 X |
| 4,370,022 | 1/1983 | Johnson | 350/96.21 |

FOREIGN PATENT DOCUMENTS

| 2602661 | 7/1977 | Fed. Rep. of Germany | 350/96.21 |
| 52-77736 | 6/1977 | Japan | 350/96.21 |
| 2034069 | 5/1980 | United Kingdom | 350/96.21 |

*Primary Examiner*—John D. Lee
*Attorney, Agent, or Firm*—F. Brice Faller

[57] ABSTRACT

Apparatus 50 for splicing a pair of optical waveguides 32,34 in a splice 5 having three cylindrical rods 2 in a tubular plastic body 12 having a profiled surface 20 which is radially compressed by crimping collars 26. Apparatus 50 has holders 96,96' which hold body 12 stationary and clamping pins 106,106' activated by clamping levers 102,102' to hold waveguides 32,34 stationary while crimpers 90,90' are moved together by rotating handle 65'. Clamping slide 114 and clamp 116 travel on rods 115,117 a limited distance useful in placing the waveguide ends in the center of the splice 5 prior to moving the crimping collars 26.

7 Claims, 11 Drawing Figures

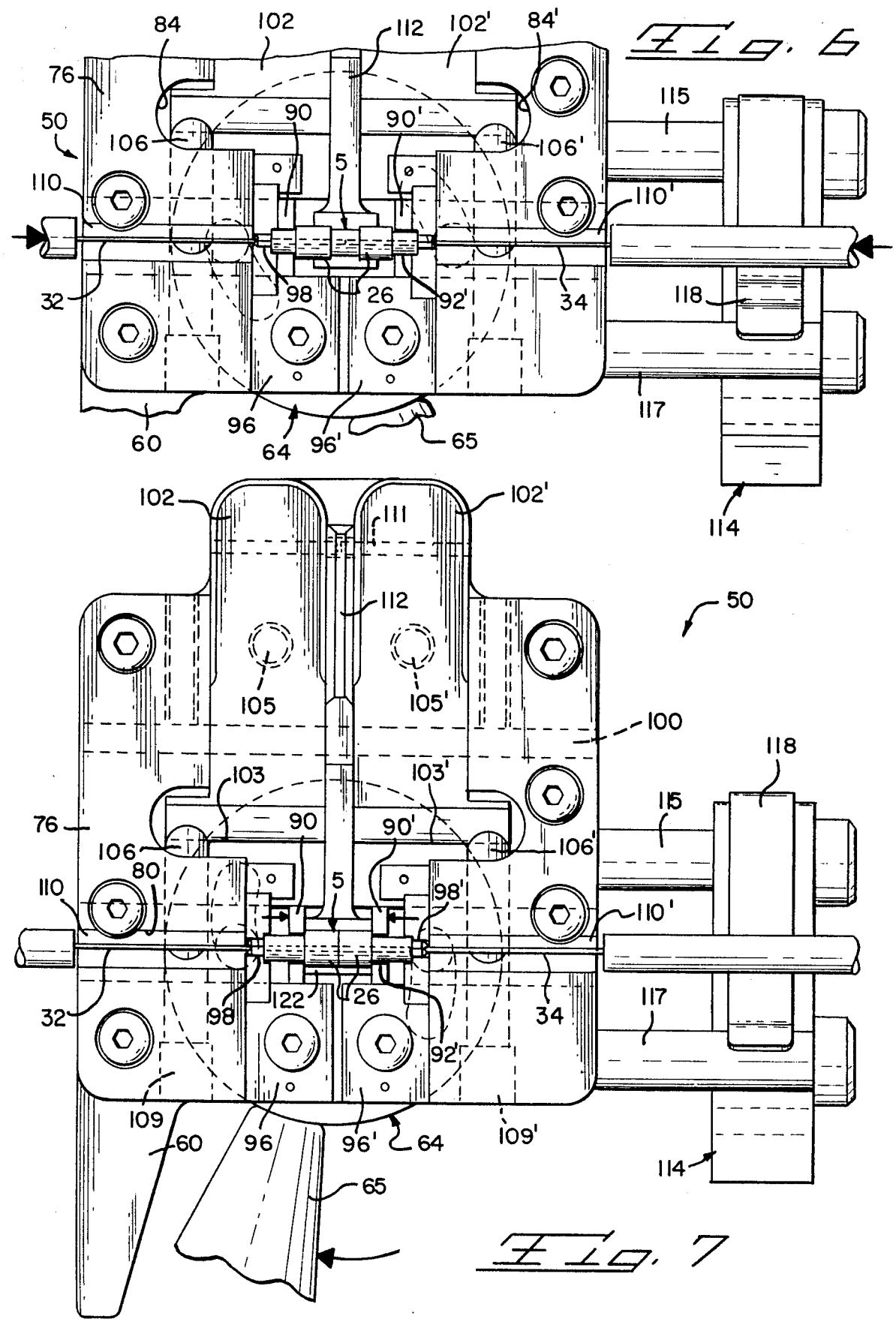

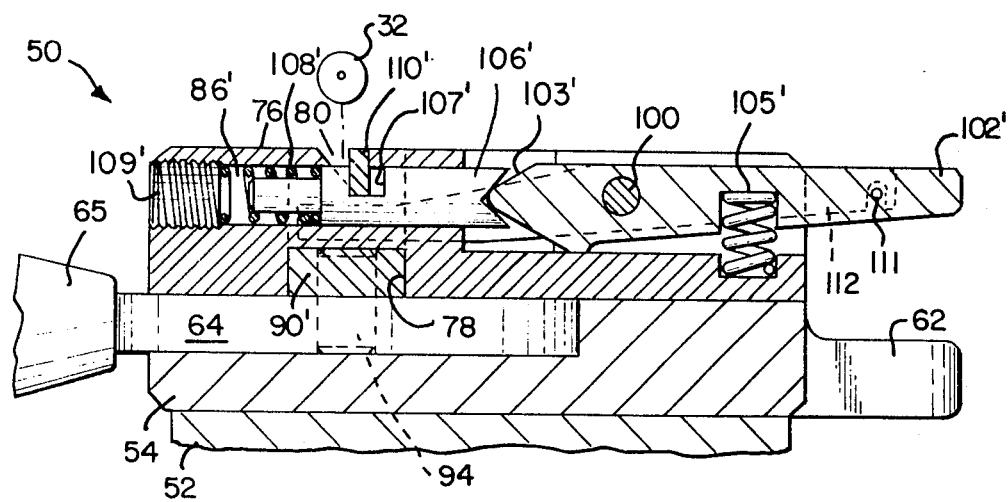
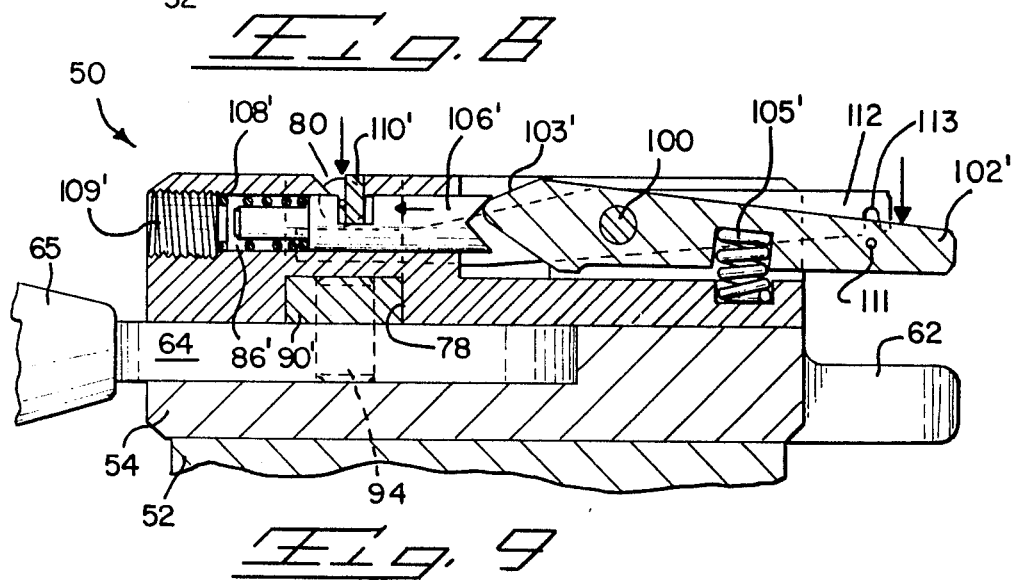

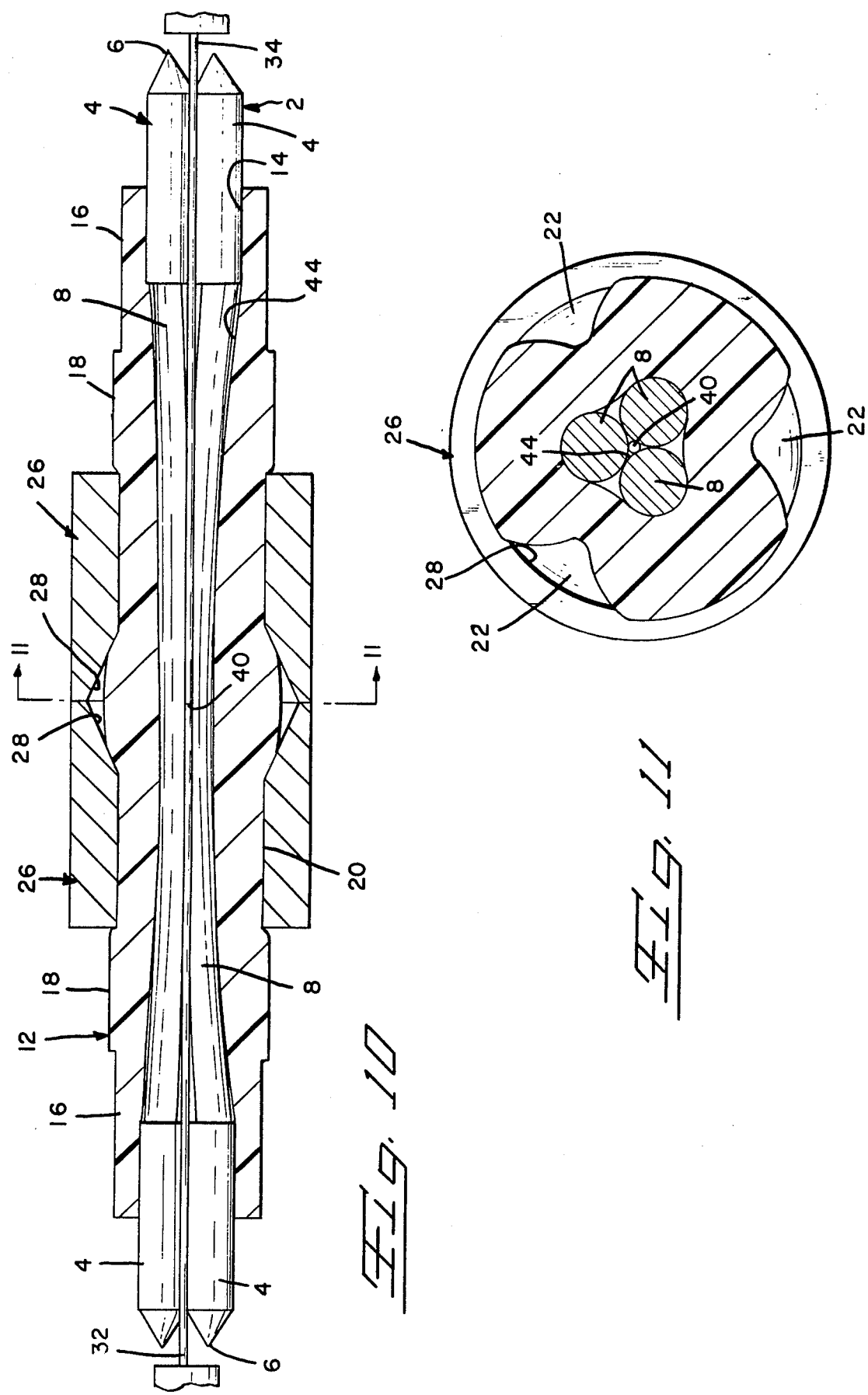

APPARATUS FOR SPLICING FIBER OPTIC WAVEGUIDES

BACKGROUND OF THE INVENTION

The present invention relates to a method and apparatus for aligning a pair of waveguides in a splice of the type disclosed in U.S. Pat. No. 4,370,022 and advancing crimping collars to complete the splice.

U.S. Pat. No. 4,370,022 discloses an economical splice which is field applicable, compact, and affords positive mechanical coupling of a pair of waveguides. Other splices which utilize multiple cylindrical rods are secured by contracting members such as shrink tubing, e.g., U.S. Pat. No. 4,019,241, or screw means, e.g., U.S. Pat. No. 4,047,796. The splice disclosed in U.S. Pat. No. 4,370,022, however, requires uniform advance of crimping collars to the center of the splice while the waveguides are fixedly held with ends abutting in the center of the splice.

SUMMARY OF THE INVENTION

An apparatus is disclosed which permits quick and accurate field placement and termination of waveguides in a three rod splicer of the type disclosed in U.S. Pat. No. 4,370,022. A pair of splice holders having profiled cradles hold the splice stationary while a pair of waveguide clamps hold the waveguides stationary. Crimping is accomplished by a pair of crimpers having U-shaped cradles which bear against the crimping collars from opposite sides. The crimpers are axially aligned inside of the splice holders while the waveguide clamps are axially aligned outside. A slideable clamping device axially aligned with the splice holders having travel limited to half the length of the splice is useful for centering the ends of the waveguides in the splice. The completed splice is removed from the apparatus by depressing an ejection lever which simultaneously releases the waveguide clamps.

It is an object of the invention to provide a compact apparatus suitable for field use.

It is another object to provide an apparatus with means for centering the waveguides in the center of the splice.

It is a further object to provide an apparatus which simultaneously advances crimping collars to the center of the splice so that maximum radial compression of the cylindrical rods occurs where the ends of the waveguides abut, so that precise alignment is assured.

BRIEF DESCRIPTION OF THE DRAWINGS

FIG. 6 is a top view of the apparatus with the waveguides in position.

FIG. 7 is a top view of the apparatus with the ferrules crimped on the splice.

FIG. 8 is a side cross section of the waveguide clamping mechanism prior to clamping, taken along line 8—8 of FIG. 4.

FIG. 9 is a side cross section of the waveguide clamping mechanism after clamping.

FIG. 10 is a side section of the completed splice.

FIG. 11 is an end section of the completed splice.

DETAILED DESCRIPTION OF THE PREFERRED EMBODIMENT

Figure 1:
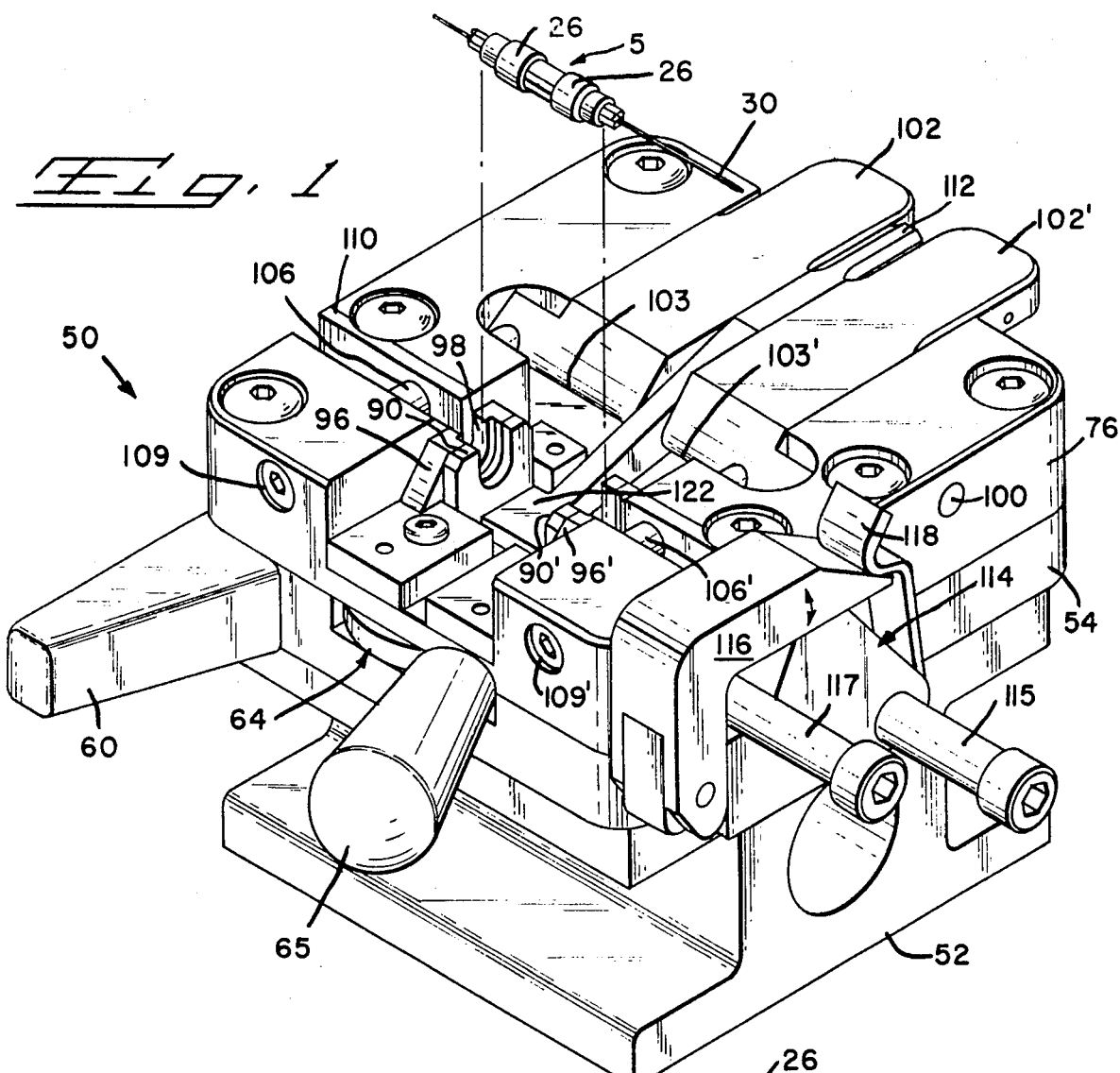
FIG. 1 is a perspective of the apparatus and waveguide splice.

FIG. 1 depicts the apparatus 50 with the connector or splice 5 poised thereabove ready for positioning in the splice holders 96,96' so that the crimping collars 26 will lie between the crimpers 90,90'. The splice 50 is of the type described in U.S. Pat. No. 4,370,022, which application is hereby incorporated by reference. The crimpers 90,90', which are actuated by rotating handle 65, are designed to simultaneously move together to push the collars 26 toward the middle of the splice 5 to effectuate splicing of waveguides as disclosed in U.S. Pat. No. 4,370,022. Levers 102,102' actuate clamping pins 106,106' which hold the waveguides in place during splicing. Clamping slide 114 is slideable on rod 115 and is used to position the waveguides for splicing as will be described. Ejector lever 112 is used to eject the splice 5 from the holders 96,96' after crimping is completed.

Figure 2:
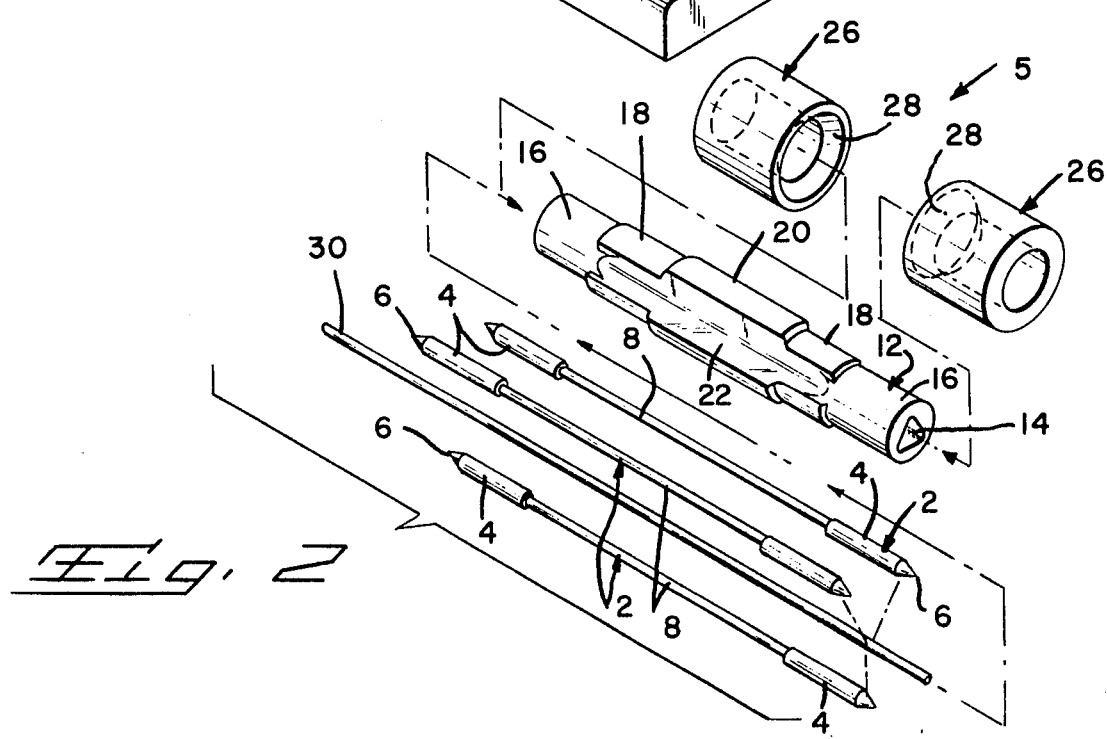
FIG. 2 is a perspective of the waveguide splice components.

FIG. 2 is a view of the waveguide components, and uses the same reference numerals as applied in U.S. Pat. No. 4,370,022 for simplicity. The splice comprises three elongate cylindrical rods 2 having larger diameter end portions 4 which terminate in conical tips 6 and are flanked on the inside by intermediate segments 8. The rods 2 are dimensioned so that the end portions 4 of three rods together fit snugly in the axial passage 14 in elongate tubular elastomeric body 12. The body 12 is profiled on the outside with a first peripheral step 16 at each end, each step 16 flanked on the inside by a second step 18 of slightly larger diameter, and a third step 20 lying between the steps 18 at the center of the body 12. The third step 20 is profiled with parallel V-grooves 22 in its surface. Crimping collars 26 are profiled with bores 28 for interference fit over the second steps 18, which in turn causes inward radial deflection of the intermediate segments 8 of the parallel rods 2. Shipping wire 30 controls the degree of inward deflection.

Figure 3:
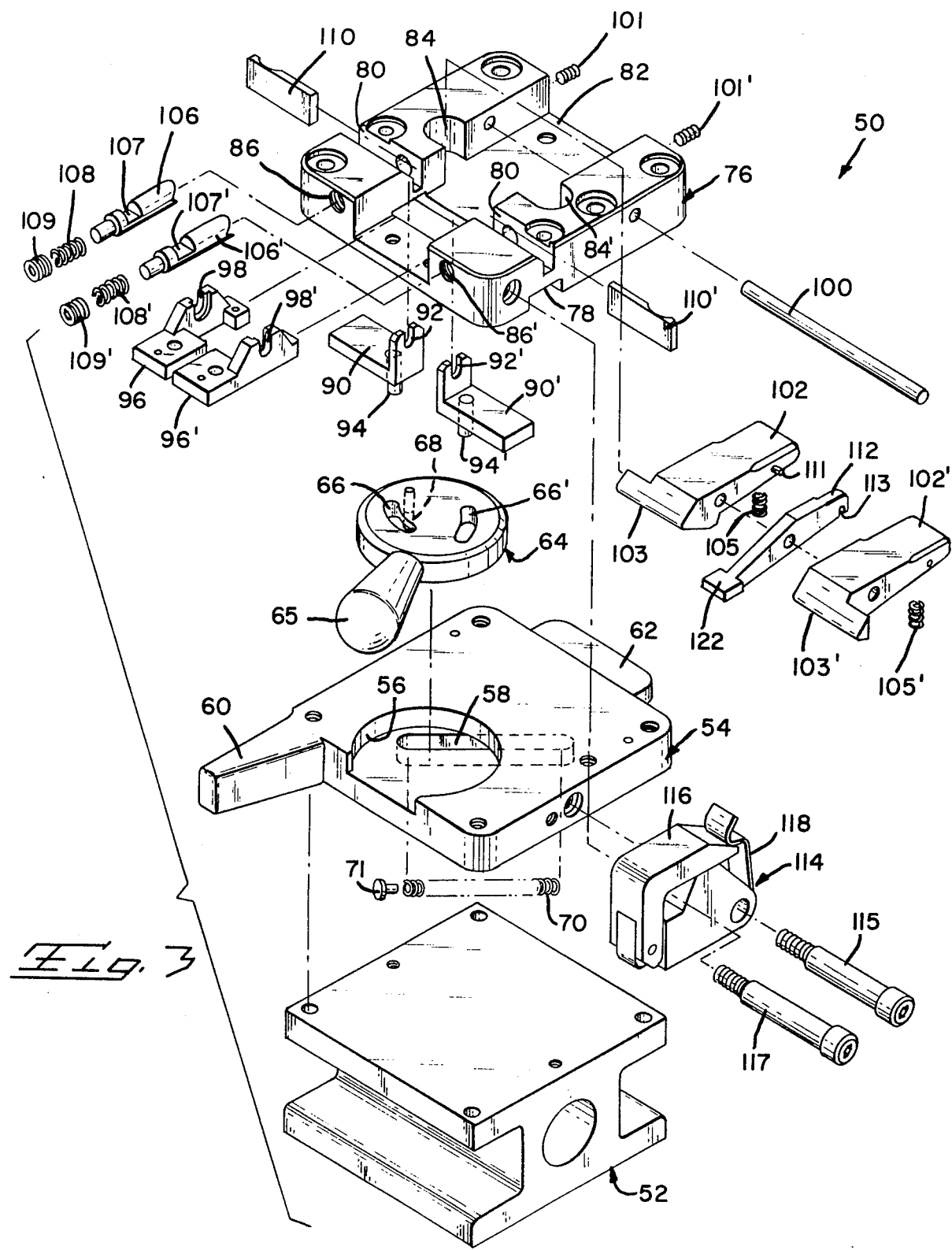
FIG. 3 is a perspective of the apparatus components.

FIG. 3 is an exploded perspective of the apparatus from which the operation of the components will be apparent. The basic structural members are the base 52, middle plate 54, and top plate 76. The middle plate 54 is profiled on top with a circular depression 56 which carries camming plate 64, and on the bottom with an elongate slot 58 which carries spring 70 and button 71. The button 71 bears against pin 68 mounted in the bottom of the camming plate 64 to urge the plate 64 counterclockwise as the handle 65 is rotated clockwise during crimping. Front extension 60 is provided as an aid to rotating handle 65 against the resistance of crimping.

Top plate 76 is profiled with a transverse slot 78 across the bottom which carries the L-shaped crimpers 90, 90'. The crimpers have pins 94,94' protruding from the bottom thereof which ride in arcuate cam slots 66,66' respectively in the camming plate 64 to effect movement of the crimpers 90,90' upon rotating handle 65. The top surface of plate 76 has a longitudinal channel 82 which intersects the channel 78 and allows movement of crimping cradles 92, 92' as the crimpers 90,90' are actuated. Connector holders 96,96' are fixed in the channel 82 so that holding cradles 98,98' are axially aligned with the crimping cradles 92,92'. Each cradle 98,98' is profiled with two adjacent U-shaped slots whose function will be apparent with reference to FIGS. 4 through 7. Waveguide clamping levers 102,102' with ejector 112 are nestled in channel 82 and journaled pivotably to rod 100 which is fit through bores in the top plate and held stationary therein by set screws 101,101'. The levers 102,102' have respective cams 103,103' at the opposite ends. The levers 102,102' are urged resiliently upward by springs 105,105' mounted in depressions in the channel 82. The cams 103,103' are situated in offsets 84,84' which intersect bores 86,86' respectively. The bores 86,86' carry the clamping pins 106,106' respectively which are held resiliently against the camming surfaces 103,103' by springs 108,108' and set screws 109,109'. The pins 106,106' have clamping slots 107,107' therein which align with transverse slot 80 in the top plate 76. The transverse slot 80 also carries shim plates 110,110' against which the clamping slots 107,107' abut. The slots 107,107' and shim plates 110,110' cooperate to act as waveguide clamps as will be most apparent with reference to FIGS. 8 and 9. The ejector lever 112 has an ejector 122 at its opposite end which is located between the crimping cradles 90,90'. Rod 115 is screwed into middle plate 54 and carries clamping slide 114 to which clamp 116 is hinged and clipped in place by leaf spring retainer 118. Rod 117 is threaded into plate 76 and passes between the clamping slide 114 and the clamp 116 so that releasing the retainer 118 will permit the clamp 116 to open and the clamping slide 114 to pivot counter-clockwise about the rod 115.

Figure 4:
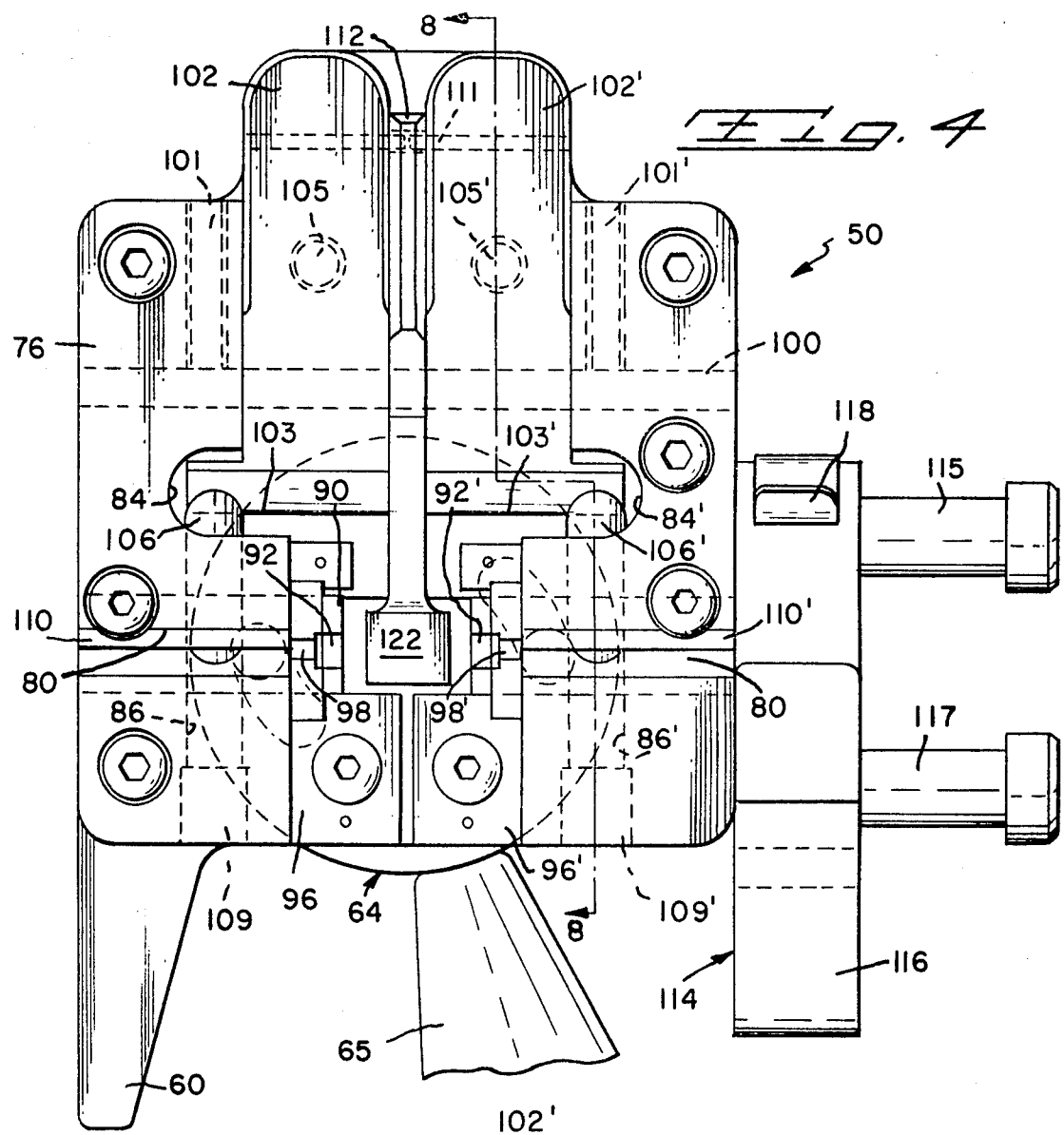
FIG. 4 is a top view of the apparatus.
Figure 5:
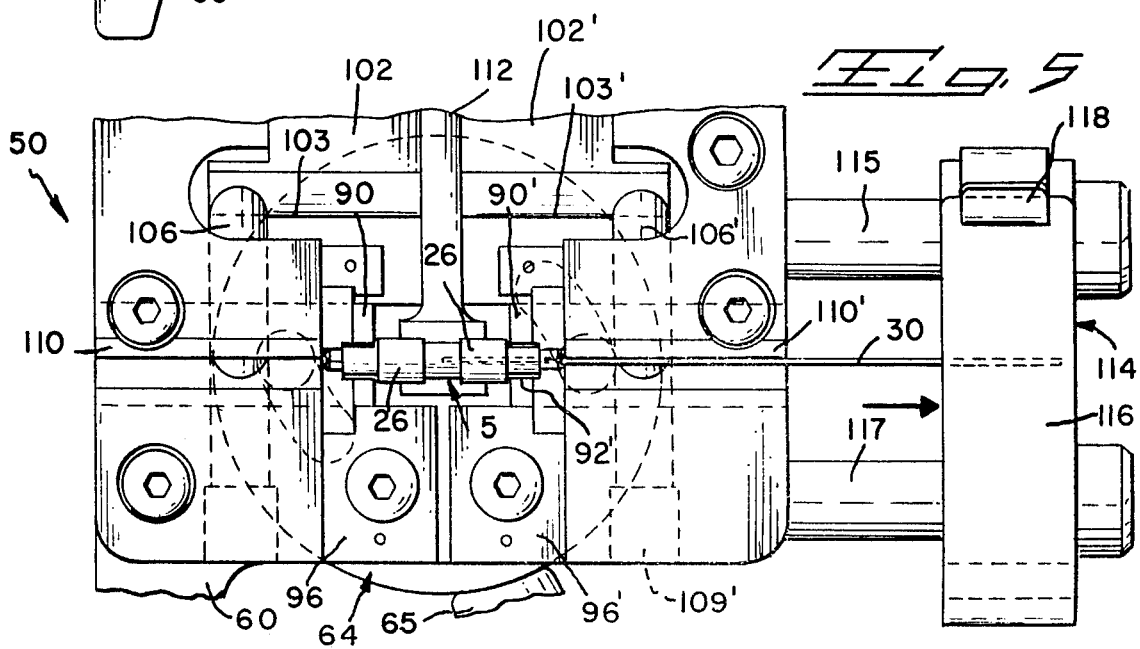
FIG. 5 is a top view of the apparatus with the shipping rod centered by the sliding clamp.

Referring now to FIGS. 4 through 7, the sequence of operations in the splicing of two fiber optic waveguides will be described. FIG. 4 is a top view of the apparatus prior to insertion of the connector. Note that the clamp 116 is open and the crimping cradles 92,92' are against the holding cradles 98,98' respectively. FIG. 5 shows the splice 5 in position in the apparatus with the shipping wire 30 pulled from the right end of the splice. The shipping wire 30 is sized such that when the left end of the wire is flush with ends of the elongate rods 2, the right end can be clamped between the clamping slide 114 and the clamp 116 as they abut the apparatus 50. The rightward travel of the clamping slide 114 and clamp 116 is limited so that if the left end of shipping wire 30 is pre-positioned flush with the rods 2, it will be precisely in the middle of the splice when the clamp is moved to the right as shown in FIG. 5.

Subsequent to positioning the shipping wire 30 as shown in FIG. 5, the clamping lever 102 is depressed so that the camming surface 103 pushes upward against an arcuate cut in the end of the clamping pin 106. The pin 106 thus moves against spring 108 and the edge of the clamping slot 107 moves away from the shim 110. This is shown cross-sectionally in FIG. 9. A waveguide 32 is then placed in the left end of the splice 5 in the interstitial space between the rods 2 until the waveguide abuts the left end of the shipping rod 30. The lever 102 is then released so that the waveguide 32 is firmly clamped between the edge of slot 107 and the shim 110. The clamp 116 is then opened and the shipping rod removed. A second waveguide 34 is then placed in the right end of the splice 5 until it abuts the waveguide 32 as shown in FIG. 6, and the clamping pin 106' is actuated in the manner of the clamp 106. FIG. 6 thus shows the waveguides 32, 34 with their ends against each other and held firmly against axial movement by the pins 106,106'. The waveguide clamping procedure described above is shown crosssectionally in FIGS. 8 and 9.

FIG. 7 depicts the completion of the crimping operation as the handle 65 is rotated clockwise, causing the crimpers 90,90' to bear against the crimping collars 26 and push them over the third or intermediate step 20 of the elastomeric body 12. Here the profile of the holding cradles 98, 98' is important, as the larger or inner portion of each cradle 98,98' closely accommodates the ends of the tubular body 12, while the smaller or outer portion of each cradle 98,98' closely accommodates rods 2. Thus the body 12 is held stationary so that the crimping collars 26 simultaneously approach the center of the body 12. After crimping is completed, the completed splice is ejected by depressing the ejector lever 112 to pivot the ejector 112 upward and eject the splice out of holding cradles 98,98'. The ejector 122 is returned by the action of springs 105,105' as the pins 111 on clamping cam levers 102,102' bear in slot 113 of the ejector lever 112. This action is apparent in FIG. 9.

Referring to FIGS. 10 and 11, it can be seen that the inward movement of the crimping collars 26 causes inward radial compression of the body to deflect the rods 2 inward to align the waveguides 32,34 and further causes plastic deformation of the body 12 in the bores 28 so that the plastic deforms into the V-grooves inside of the collars 26 which serves to help retain the collars at the middle of the body 12.

Note that while the shipping wire 30 is utilized in the above described method to center the waveguides 32,34 in the interstitial passageway 44, other centering methods utilizing the clamping slide 114 are possible. For example, a waveguide 34 could be placed in the apparatus with its end flush against the right end of the right ends of the rods 2 and then clamped by clamp 116 while the clamping slide is at the right limit of its travel as shown in FIG. 6. Leftward movement of the clamping slide 116 will then place the end 40 of the waveguide in the center of the splice 2, and it can then be clamped so that the other waveguide 32 can be inserted and the crimping operation performed.

The above description is illustrative and not intended to limit the scope of the claims which follow.

We claim:

1. Apparatus 50 for splicing a pair of optical waveguides 32, 34 in a connector 5 of the type having an elongate tubular body 12 with a stepped external surface, three elongate cylindrical rods 2 therein defining an interstitial passageway 44 therebetween, and a pair of crimping collars 26 which are advanced to the center of the body 12 to radially compress the body 12 and effectuate the splice, said apparatus 50 comprising:
    means for advancing said crimping collars 26 toward the center of said body 12, said means comprising U-shaped crimping cradles 92, 92' which bear against said collars 26 from opposite directions,
    holding means for holding said tubular body 12, said holding means remaining stationary while said means for advancing advances said crimping collars.

2. The apparatus of claim 1 wherein said holding means comprises a pair of U-shaped holding cradles 98,98' on opposite sides of said crimping cradles 92,92' and axially aligned therewith, said holding cradles 98,98' being profiled to hold the ends of the tubular body 12 and prevent axial movement thereof.

3. The apparatus of claim 2 which further comprises waveguide clamping means on opposite sides of said holding means.

4. The apparatus of claim 3 wherein said clamping means comprise a pair of individually actuable clamps axially aligned with said holding means, each said clamp being actuated by a lever 102,102'.

5. The apparatus of claim 4 wherein said clamps are actuated by a side-by-side pair of waveguide clamping levers 102,102' with an ejector lever 112 therebetween, said ejector lever 112 having means for simultaneously acting on said clamping levers 102,102' when said ejector lever 112 is acted on, said ejector lever 112 actuating an ejector 122 which releases said connector 5 from said apparatus, whereby acting on said ejector lever 112 will simultaneously release said waveguide clamps 106,106' as said connector 5 is ejected from said apparatus 50.

6. The apparatus of claim 1 which further comprises waveguide centering means, said centering means comprising a clamping slide 114 which moves parallel to the axis of the connector 5 a limited distance determined by the dimension of the connector 5, said clamping slide 114 cooperating with a clamp 116 adapted to grip a waveguide 34 aligned coaxially with the axis of the connector 5, whereby clamping a waveguide 34 with its end 40 proximate to said connector 5 and advancing said slide 114 toward said connector 5 will move said waveguide 34 into said interstitial passageway 44.

7. The apparatus 50 of claim 6 wherein said limited distance is about one half the total length of the connector 5, whereby gripping said waveguide 34 in said centering means when it is remote from said connector 5, said end of said waveguide being at the same time flush with the end of the connector 5, and advancing said clamping slide 114 toward said connector 5 said limited distance will result in said end of said waveguide 34 being positioned about in the center of said connector.

* * * * *